(12) United States Patent
Uchino et al.

(10) Patent No.: US 9,392,586 B2
(45) Date of Patent: Jul. 12, 2016

(54) MOBILE STATION AND RADIO BASE STATION

(71) Applicant: NTT DOCOMO, INC., Tokyo (JP)

(72) Inventors: Tooru Uchino, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/376,468

(22) PCT Filed: Nov. 5, 2013

(86) PCT No.: PCT/JP2013/079862
§ 371 (c)(1),
(2) Date: Aug. 4, 2014

(87) PCT Pub. No.: WO2014/080753
PCT Pub. Date: May 30, 2014

(65) Prior Publication Data
US 2015/0004990 A1 Jan. 1, 2015

(30) Foreign Application Priority Data
Nov. 22, 2012 (JP) .................. 2012-256263

(51) Int. Cl.
H04W 72/04 (2009.01)
H04W 48/16 (2009.01)
H04W 48/12 (2009.01)

(52) U.S. Cl.
CPC .......... *H04W 72/0406* (2013.01); *H04W 48/16* (2013.01); *H04W 48/12* (2013.01)

(58) Field of Classification Search
None
See application file for complete search history.

(56) References Cited

U.S. PATENT DOCUMENTS

| | | | | |
|---|---|---|---|---|
| 5,873,036 A | * | 2/1999 | Vucetic | H04W 72/1289 455/11.1 |
| 6,097,938 A | * | 8/2000 | Paxson | H04L 63/0492 455/410 |
| 6,101,391 A | * | 8/2000 | Ishizuka | H04W 64/00 455/414.1 |
| 8,094,618 B2 | * | 1/2012 | Yi et al. | 370/329 |
| 8,724,506 B2 | * | 5/2014 | Butti | 370/254 |
| 8,797,941 B2 | * | 8/2014 | Park et al. | 370/315 |
| 2006/0073834 A1 | * | 4/2006 | Thorson | H04W 76/021 455/450 |
| 2006/0172728 A1 | * | 8/2006 | Lai | H04M 15/8044 455/416 |

(Continued)

FOREIGN PATENT DOCUMENTS

JP 2011 004377 1/2011
JP 2011 517185 5/2011

OTHER PUBLICATIONS

NTT Docomo,"Requirements, Candidate Solutions & Technology Roadmap for LTE Rel-12 Onward", 3GPP Workshop on Release 12 and onwards, pp. 19-22, (2012).

(Continued)

*Primary Examiner* — Ashish K Thomas
(74) *Attorney, Agent, or Firm* — Oblon, McClelland, Maier & Neustadt, L.L.P (57) ABSTRACT

Even when the same C-RNTI is assigned to multiple mobile stations in a phantom cell, collision of the mobile stations to the same C-RNTI is assigned is avoided with simple implementation. A mobile station includes: a reception unit configured to acquire C-RNTIs set for other mobile stations UE not via a radio base station; and a transmission unit configured to give the radio base station a predetermined report when there is a mobile station UE set to have the same C-RNTI #X as a C-RNTI #X set for itself.

9 Claims, 10 Drawing Sheets

(56) References Cited

U.S. PATENT DOCUMENTS

| | | | |
|---|---|---|---|
| 2009/0303909 A1* | 12/2009 | Farhoudi | H04W 76/005 370/312 |
| 2010/0093386 A1* | 4/2010 | Damnjanovic et al. | 455/522 |
| 2010/0169733 A1* | 7/2010 | Kim et al. | 714/748 |
| 2010/0254329 A1* | 10/2010 | Pan et al. | 370/329 |
| 2010/0255852 A1* | 10/2010 | Chen et al. | 455/450 |
| 2010/0278037 A1* | 11/2010 | Jen et al. | 370/216 |
| 2010/0323705 A1* | 12/2010 | Iwamura | H04W 88/16 455/440 |
| 2011/0013574 A1* | 1/2011 | Hsu | 370/329 |
| 2011/0098043 A1* | 4/2011 | Yu | H04W 60/00 455/435.1 |
| 2011/0098053 A1* | 4/2011 | Widegren et al. | 455/450 |
| 2011/0117923 A1* | 5/2011 | Yonezawa | G08B 13/196 455/456.1 |
| 2011/0124360 A1* | 5/2011 | Sagfors | H04L 5/0053 455/509 |
| 2012/0092989 A1* | 4/2012 | Baldemair et al. | 370/230 |
| 2012/0140740 A1 | 6/2012 | Iwamura et al. | |
| 2012/0188961 A1* | 7/2012 | Suzuki et al. | 370/329 |
| 2012/0243417 A1* | 9/2012 | Henttonen | H04W 76/046 370/241 |
| 2013/0003586 A1* | 1/2013 | Tajima | H04B 7/155 370/252 |
| 2013/0003695 A1* | 1/2013 | Nylander | H04W 36/0083 370/331 |
| 2013/0017834 A1* | 1/2013 | Han et al. | 455/437 |
| 2013/0196668 A1* | 8/2013 | Bu | H04W 36/14 455/437 |
| 2014/0177564 A1* | 6/2014 | Ma | H04W 72/1289 370/329 |
| 2014/0185495 A1* | 7/2014 | Kuchibhotla | H04W 76/023 370/281 |
| 2014/0226519 A1* | 8/2014 | Nagata et al. | 370/252 |
| 2015/0024745 A1* | 1/2015 | Zhou | H04W 48/10 455/434 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300, vol. 11.3.0, pp. 1-205, (2012).

International Search Report Issues Feb. 4, 2014 in PCT/JP13/079862 filed Nov. 5, 2013.

* cited by examiner

MOBILE STATION AND RADIO BASE STATION

TECHNICAL FIELD

The present invention relates to a mobile station and a radio base station.

BACKGROUND ART

Figure 9:
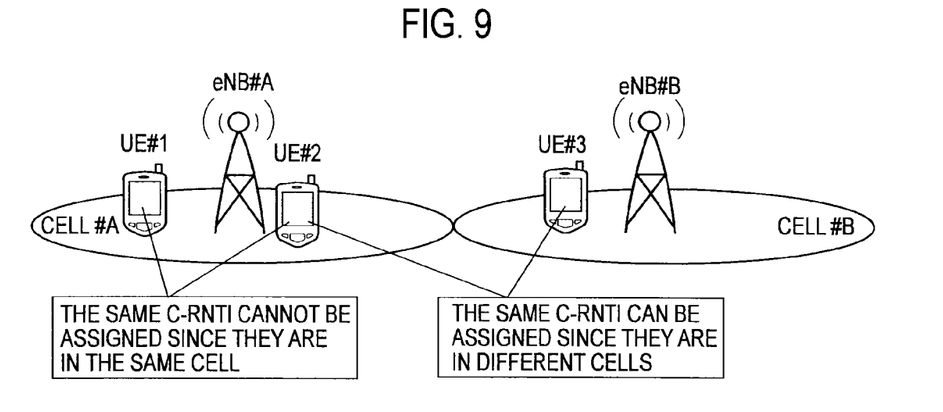
FIG. 9 is a diagram illustrating a prior art.

In LTE (Long Term Evolution), as shown in FIG. 9, radio base stations eNB#A/eNB#B are each configured to perform data transmission and reception with a mobile station UE communicating in a cell #A/#B under the radio base station eNB#A/eNB#B, by allocating a C-RNTI (Cell-Radio Network Temporary Identity) to the mobile station UE (see Non-patent document 1).

The C-RNTI is configured to be assigned on a cell basis. In LTE, as shown in FIG. 9, the same C-RNTI cannot be assigned to a mobile station UE#1 and a mobile station UE#2 which are communicating in the same cell #A, whereas the same C-RNTI can be assigned to the mobile station UE#1 (or the mobile station UE#2) and a mobile station UE#3 which are communicating in different cells #A/#B.

Note that the C-RNTI is configured to be assigned in a "Contention based RA (Random Access) procedure" or a handover procedure.

Further, the radio base station eNB is configured to assign resources for downlink data transmission and uplink data transmission by using the C-RNTI assigned to the mobile station UE.

At the 3GPP "Rel-12 workshop," under the topic of FRA (Future Radio Access), many suggestions were made for "Small cell enhancement."

Among those suggestions, a concept regarding a "phantom cell" is under consideration.

Figure 10:
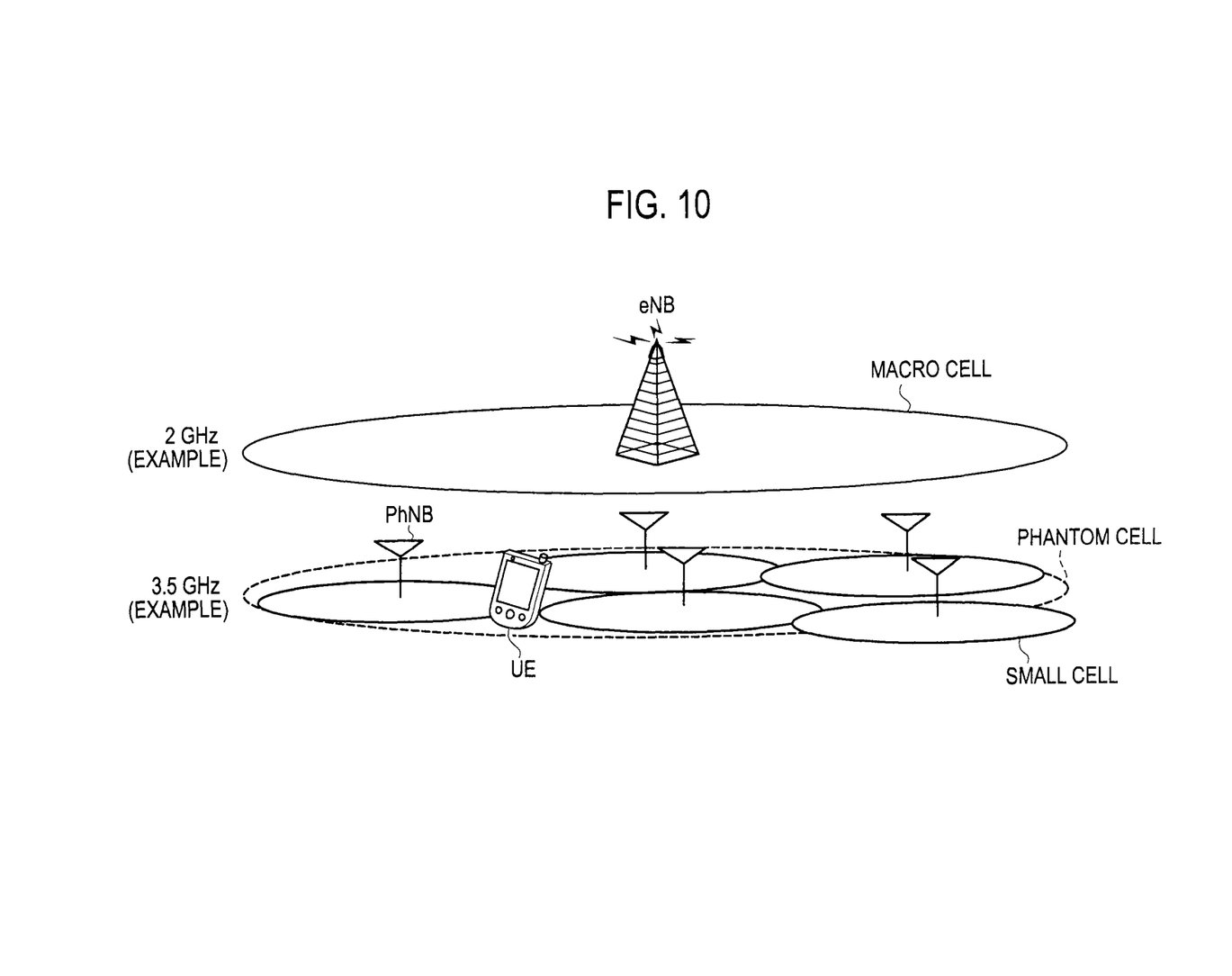
FIG. 10 is a diagram illustrating a prior art.

As shown in FIG. 10, unlike a conventional macro cell, a phantom cell is a single large cell formed by connecting many "small cells" to be able to cover a wide area.

PRIOR ART DOCUMENT

Non-Patent Document

Non-patent document 1: 3GPP TS36.300

SUMMARY OF THE INVENTION

Figure 11:
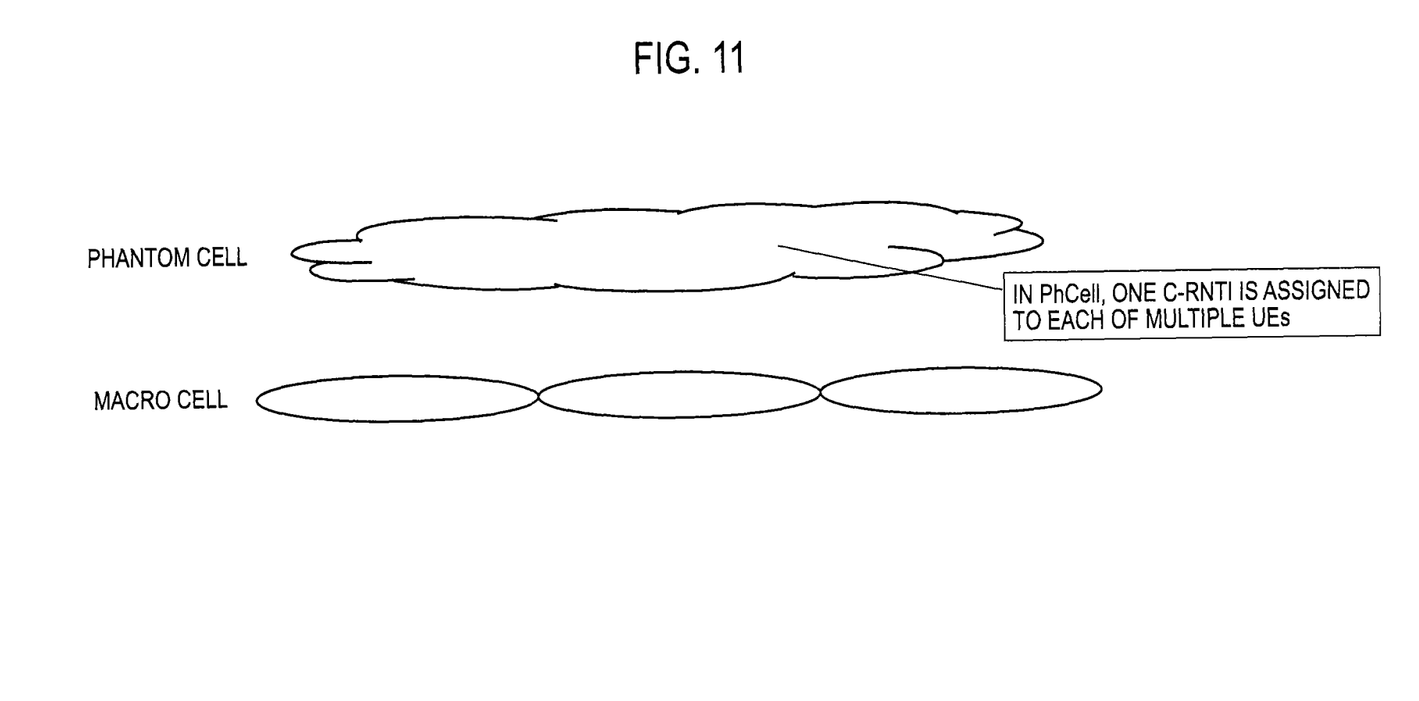
FIG. 11 is a diagram illustrating a prior art.

However, as shown in FIG. 11, each cell (a macro cell and a phantom cell) manages 65,535 C-RNTIs and needs to assign one C-RNTI to each mobile station UE.

As the coverage area of a phantom cell increases, more mobile stations UE perform communications in the phantom cell. Thus, there is a possible problem of shortage of C-RNTIs to be assigned to the mobile stations UE in the phantom cell.

Inconceivable operation performed to solve this problem, as shown in FIG. 11, one C-RNTI is assigned to each mobile station UE in a macro cell, while one C-RNTI is assigned to multiple mobile stations UE in a phantom cell (i.e., two or more mobile stations UE share one C-RNTI).

Figure 12:
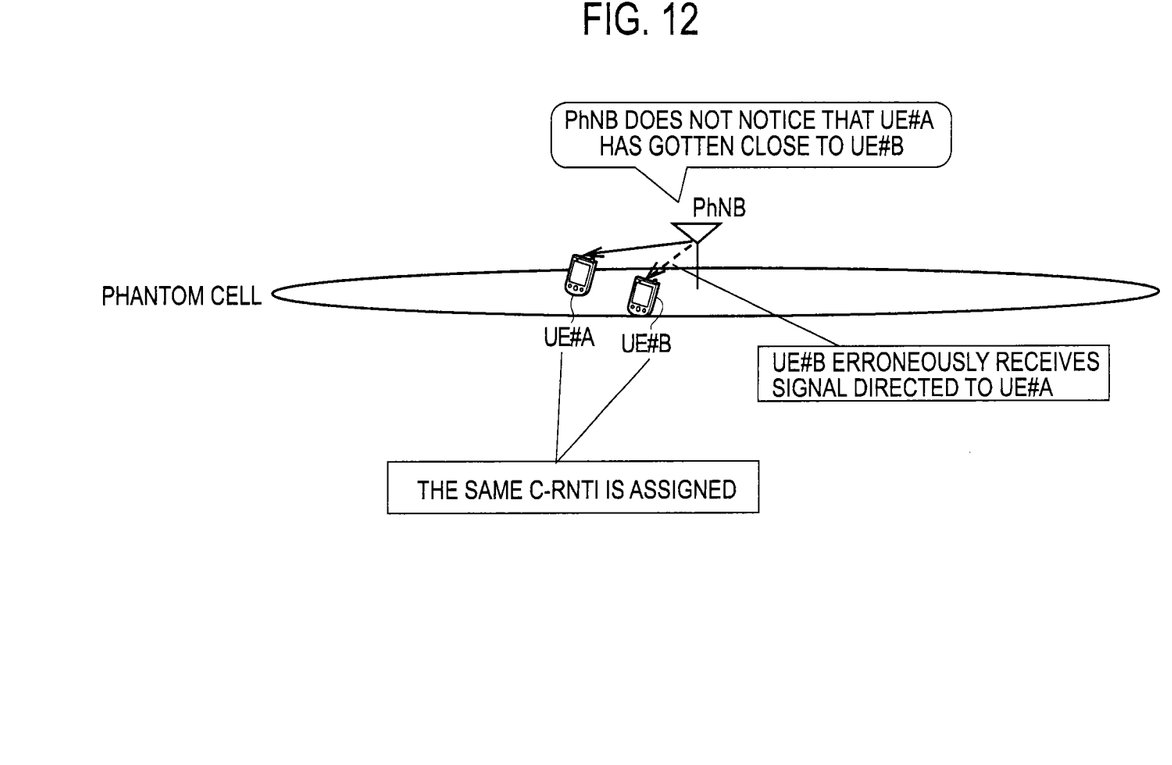
FIG. 12 is a diagram illustrating a prior art.

However, employment of such operation has a problem that collision may occur between the mobile stations UE to which the same C-RNTI is assigned in the same cell, as shown in FIG. 12. When such collision occurs, a mobile station UE not intended by the radio base station eNB might erroneously receive allocation information directed to a proper mobile station UE.

To solve this problem, it is conceivable to employ a method of maintaining a sufficient distance between the mobile stations UE to which the same C-RNTI is assigned.

To perform this method, a radio base station PhNB needs to know in real-time the distance between the mobile stations UE to which the same C-RNTI is assigned.

For example, the radio base station PhNB can know a rough location of a mobile station UE by receiving channel quality information (CSI: Channel Status Indicator/SRS: Sounding Reference Signal) from the mobile station UE.

However, there is a problem that, when resources for channel quality information (individual resources) are not set for the mobile station UE, the radio base station PhNB cannot know the location of the mobile station UE.

Moreover, there is another problem that, in order for the radio base station PhNB to know in real-time the distance between the mobile stations UE to which the same C-RNTI is assigned, implementation of the radio base station PhNB becomes complicated.

The present invention has been made in view of the above problems, and has an objective of providing a mobile station and a radio base station by which, even when the same C-RNTI is assigned to multiple mobile stations in a phantom cell, collision of the mobile stations to which the same C-RNTI is assigned can be avoided with simple implementation.

A first feature of the present invention is summarized as a mobile station including: a reception unit configured to acquire one or more cell-specific identifiers set for one or more other mobile stations not via a radio base station; and a transmission unit configured to give the radio base station a predetermined report when the one or more other mobile stations include a mobile station set to have the same cell-specific identifier as a cell-specific identifier set for itself.

A second feature of the present invention is summarized as a radio base station configured to manage a phantom cell formed by connecting a plurality of small cells, the radio base station including: a reception unit configured to acquire a predetermined report from each mobile station in the phantom cell, the predetermined report indicating that there is another mobile station set to have the same cell-specific identifier as a cell-specific identifier set for the each mobile station; and a transmission unit configured to notify the each mobile station of one of a plurality of cell-specific identifiers set for the each mobile station, in response to the predetermined report.

MODE FOR CARRYING OUT THE INVENTION

Mobile Communication System According to the First Embodiment of the Present Invention With reference to FIGS. 1 to 6, a mobile communication system according to a first embodiment of the present invention will be described.

Figure 1:
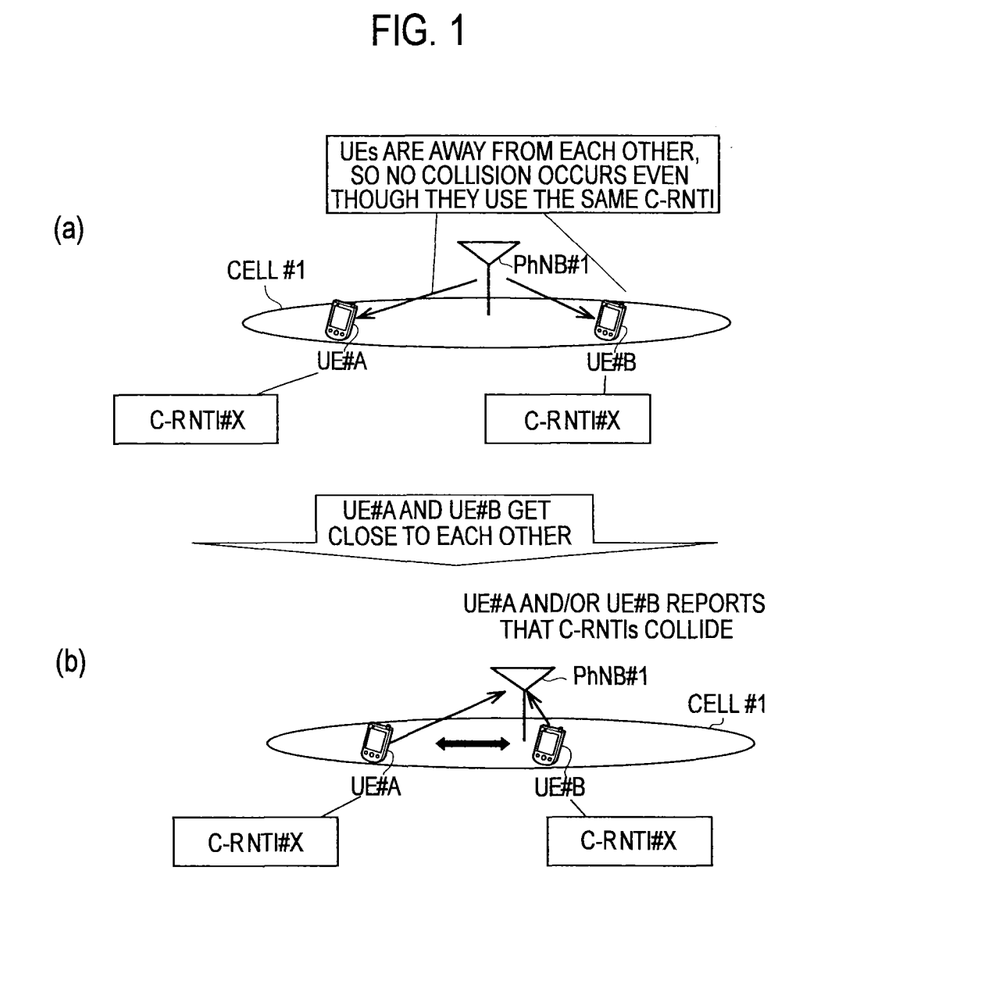
FIG. 1 is a diagram showing the overall configuration of a mobile communication system according to a first embodiment of the present invention.

As shown in FIGS. 1(a) and 1(b), the mobile communication system according to this embodiment is an LTE mobile communication system, and includes a radio base station PhNB#1 managing a cell #1. Herein, the cell #1 is a phantom cell formed by connecting multiple small cells.

In this embodiment, the radio base station PhNB#1 assigns the same C-RNTI #X to a mobile station UE#A and a mobile station UE#B in the cell #1.

Figure 2:
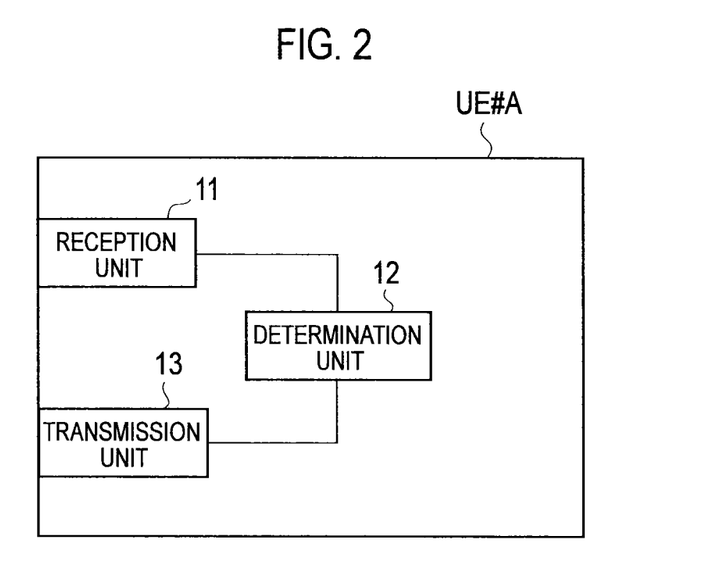
FIG. 2 is a functional block diagram of a mobile station according to the first embodiment of the present invention.

Since the mobile station UE#A and the mobile station UE#B have basically the same configuration, the configuration of the mobile station UE#A will be described below as a representative example. As shown in FIG. 2, the mobile station UE#A according to this embodiment includes a reception unit 11, a determination unit 12, and a transmission unit 13.

The reception unit 11 is configured to receive various signals from the radio base station PhNB#1 and other mobile stations UE (e.g., the mobile station UE#B).

For example, the reception unit 11 is configured to acquire C-RNTIs set for the other mobile stations UE not via the radio base station PhNB#1 but through communications between the mobile stations.

Here, the reception unit 11 may be configured to acquire the C-RNTIs via individual resources for the mobile stations UE used for communications between the mobile stations, or may be configured to acquire the C-RNTIs via shared resources used for communications between the mobile stations.

Further, the reception unit 11 may be configured to receive Polling from the other mobile stations UE, the Polling commanding the mobile station UE to report the C-RNTI set for it.

The determination unit 12 is configured to determine whether or not the C-RNTI #X set for the mobile station UE#A collides with a C-RNTI set for another mobile station UE, i.e., whether or not there exists nearby a mobile station UE set to have the same C-RNTI #X as the C-RNTI #X set for the mobile station UE#A.

For example, the determination unit 12 may be configured to make the above determination based on reception levels of signals from the other mobile stations UE (e.g., SIR: Signal to Interference Ratio/path-loss) and C-RNTIs contained in those signals.

More specifically, the transmission unit 13 may be configured to determine that the C-RNTI #X set for the mobile station UE#A collides with the C-RNTI set for another mobile station UE, i.e., that there exists nearby a mobile station UE set to have the same C-RNTI #X as the C-RNTI #X set for the mobile station UE#A, when there is a mobile station UE (e.g., the mobile station UE#B) having a reception level equal to or larger than a predetermined threshold, among the other mobile stations UE set to have the same C-RNTIs #X as the C-RNTI #X set for the mobile station UE#A.

The transmission unit 13 is configured to transmit various signals to the radio base station PhNB#1 and to the other mobile stations UE (e.g., the mobile station UE#B).

The transmission unit 13 may be configured to, upon detection of a collision check trigger, transmit Polling to the other mobile stations UE to command them to report the C-RNTIs set for them.

Note that the transmission unit 13 may be configured to transmit the Polling periodically, may be configured to transmit the Polling in response to a command from the other mobile stations UE or the radio base station PhNB, or may be configured to transmit the Polling when the necessity to communicate arises.

For example, the transmission unit 13 is configured such that, when the determination unit 12 determines that the C-RNTI #X set for the mobile station UE#A collides with a C-RNTI set for another mobile station UE, i.e., that there exists nearby a mobile station UE set to have the same C-RNTI #X as the C-RNTI #X set for the mobile station UE#A (see FIG. 1(b)), the transmission unit 13 gives the radio base station PhNB#1 a predetermined report indicating that there exists the mobile station UE (e.g., the mobile station UE#B) set to have the same C-RNTI #X as the C-RNTI #X set for the mobile station UE#A.

This predetermined report reports that the C-RNTI #X set for the mobile station UE#A collides with a C-RNTI set for another mobile station UE, i.e., that there exists nearby a mobile station UE set to have the same C-RNTI #X as the C-RNTI #X set for the mobile station UE#A.

For example, the transmission unit 12 may be configured to give the predetermined report described above by using a predetermined bit.

Figure 3:
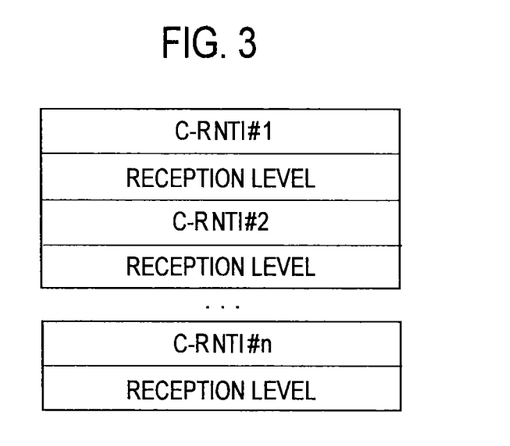
FIG. 3 is a diagram showing an example of a reporting method by the mobile station according to the first embodiment of the present invention.

Moreover, as shown in FIG. 3, the transmission unit 13 may be configured to report, as the predetermined report, all the reception levels of signals acquired by the reception unit 11 and the C-RNTIs of the other mobile stations UE contained in those signals.

Here, the transmission unit 13 may be configured to report a measurement time of each signal as well.

Further, the transmission unit 13 may be configured to report the C-RNTI set for the mobile station UE (e.g., the mobile station UE#B) having a reception level equal to or larger than the predetermined threshold as well as the reception level, among the other mobile stations UE set to have the same C-RNTIs #X as the C-RNTI #X set for the mobile station UE#A.

The transmission unit 13 may also be configured to give the predetermined report described above targeted only at a C-RNTI designated by the radio base station PhNB#1.

Figure 4:
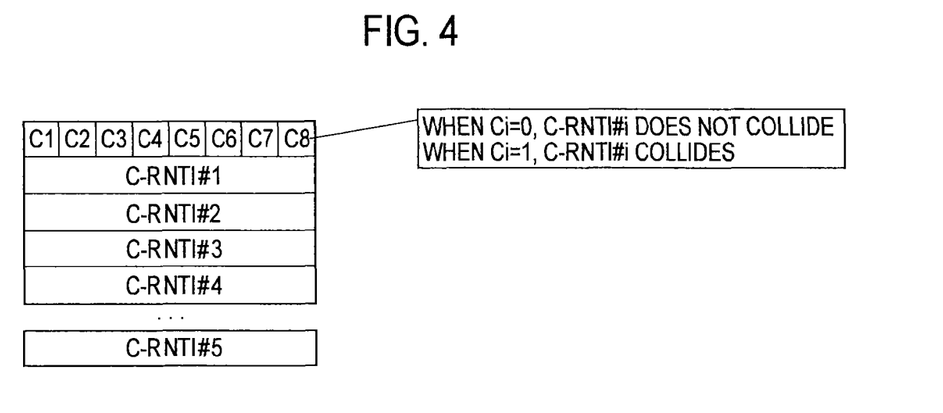
FIG. 4 is a diagram showing an example of a reporting method by the mobile station according to the first embodiment of the present invention.

For example, in such a case, the transmission unit 13 is configured to report, as the predetermined report, whether the C-RNTI designated by the radio base station PhNB#1 as shown in FIG. 4 collides with the C-RNTI #X set for the mobile station UE#A or not, i.e., whether the C-RNTI designated by the radio base station PhNB#1 is the same as the C-RNTI #X set for the mobile station UE#A or not.

Further, the transmission unit 13 may be configured to transmit the number of settable C-RNTIs to the radio base station PhNB#1.

Furthermore, the transmission unit 13 may be configured to activate a connection re-establishment procedure upon detection that the set C-RNTI is different between the mobile station UE#A and the radio base station PhNB#1 (e.g., when there is no response from the radio base station PhNB#1 for a certain period of time).

Figure 5:
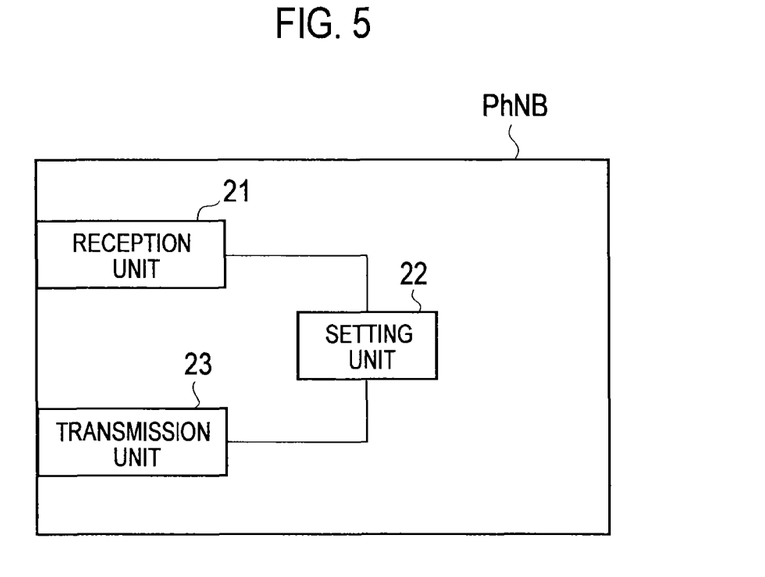
FIG. 5 is a functional block diagram of a radio base station according to the first embodiment of the present invention.

As shown in FIG. 5, the radio base station PhNB#1 includes a reception unit 21, a setting unit 22, and a transmission unit 23.

The reception unit 21 is configured to receive various signals from the mobile stations UE#A/UE#B.

For example, the reception unit 21 is configured to receive the predetermined report described above or the number of settable C-RNTIs from the mobile station UE#A/UE#B.

The setting unit 22 is configured to set (assign) a C-RNTI for (to) the mobile station UE#A/UE#B in the cell #1.

For example, the setting unit 22 is configured to perform this setting according to the predetermined report described above or the number of settable C-RNTIs.

Here, the setting unit 22 may be configured to be able to set multiple C-RNTIs to each mobile station UE#A/UE#B in the cell #1.

The transmission unit 23 is configured to transmit various signals to the mobile station UE#A/UE#B.

For example, the transmission unit 23 is configured to notify each mobile station UE#A/UE#B in the cell #1 of the C-RNTI #X set by the setting unit 22.

Further, the transmission unit 23 may be configured to start scheduling for the mobile station UE#A (or the mobile station UE#B), once the reception unit 21 receives the predetermined report from the mobile station UE#A (or the mobile station UE#B).

The transmission unit 23 may command the mobile station UE#A to release and reset the C-RNTIs #X/#Y set for the mobile station UE#A when the set C-RNTI is detected to be different between the mobile station UE#A and the radio base station PhNB#1 (for example, when there is no response from the mobile station UE#A for a certain period of time).

Figure 6:
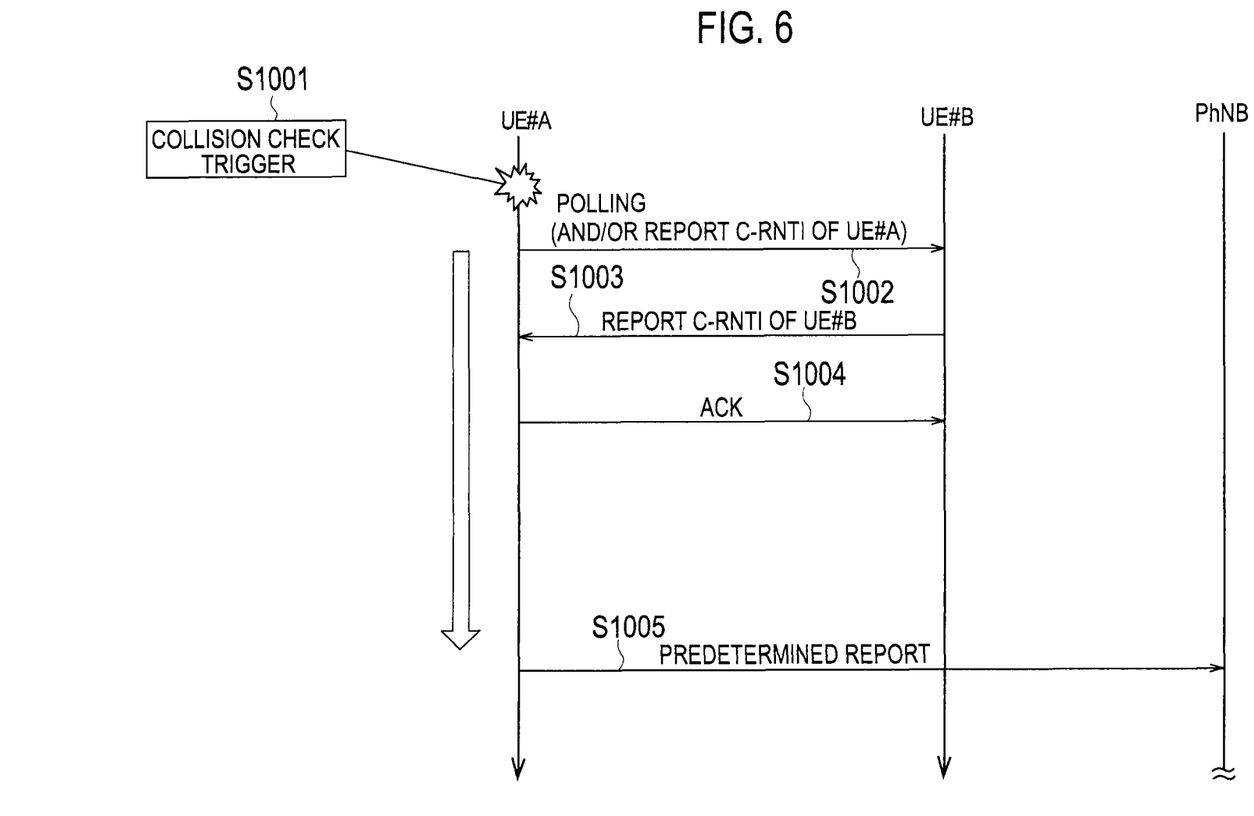
FIG. 6 is a sequence diagram showing operation of the mobile communication system according to the first embodiment of the present invention.

With reference to FIG. 6, operation of the mobile communication system according to this embodiment will be described below.

As shown in FIG. 6, upon detection of a collision check trigger in Step S1001, the mobile station UE#A transmits the Polling described above to the mobile station UE#B in Step S1002. This Polling contains the C-RNTI #X set for the mobile station UE#A.

In Step S1003, in response to the Polling, the mobile station UE#B transmits the C-RNTI set for the mobile station UE#B to the mobile station UE#A.

Upon acquisition of the C-RNTI set for the mobile station UE#B, the mobile station UE#A may transmit ACK to the mobile station UE#B in Step S1004.

The mobile station UE#A monitors response from the other mobile stations UE for a predetermined period of time, and if there is a mobile station UE colliding with the C-RNTI #X set for the mobile station UE#A, gives the predetermined report described above to the radio base station PhNB#1 in Step S1005.

Alternatively, the mobile station UE#A may monitor response from the other mobile stations UE for a predetermined period of time, and if there is no mobile station UE colliding with the C-RNTI #X set for the mobile station UE#A, gives a predetermined report indicative of that to the radio base station PhNB#1 in Step S1005.

(Modification 1)

Figure 7:
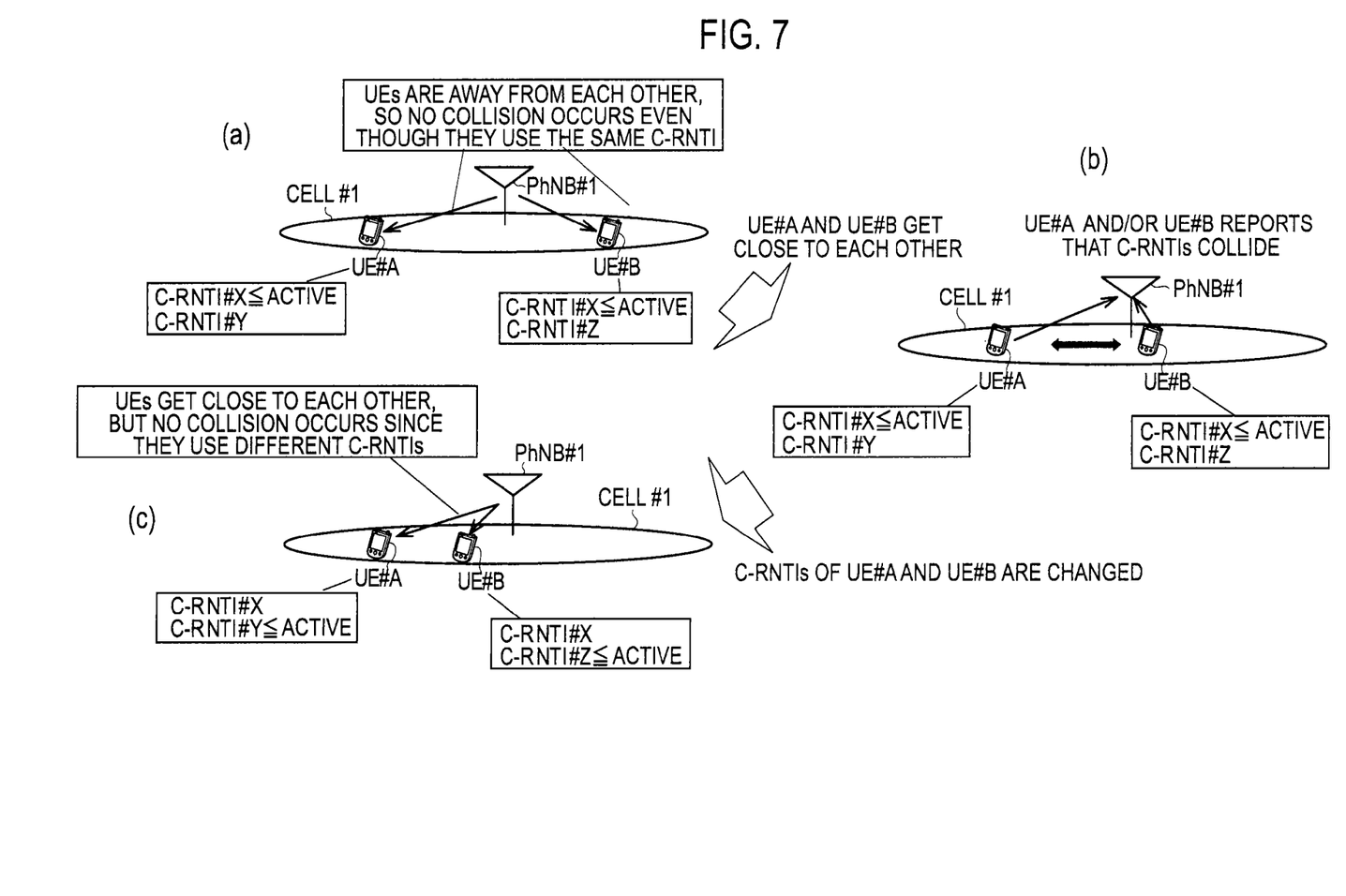
FIG. 7 is a diagram showing the overall configuration of a mobile communication system according to Modification 1 of the present invention.
Figure 8:
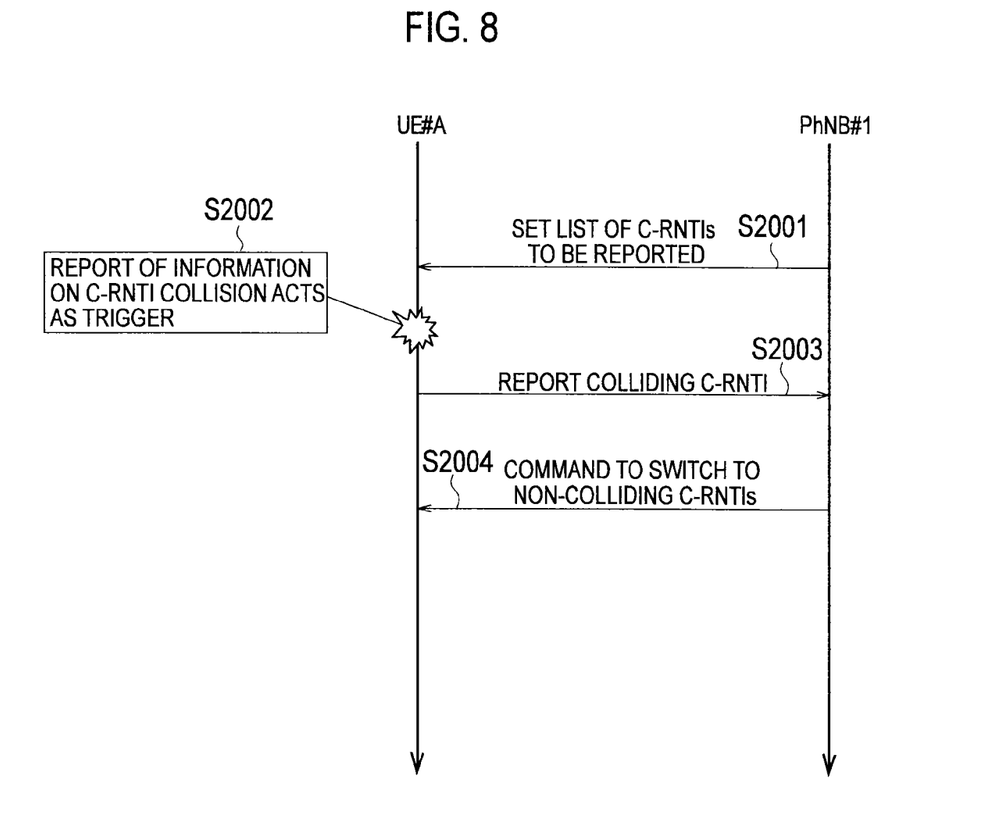
FIG. 8 is a sequence diagram showing operation of the mobile communication system according to Modification 1 of the present invention.

With reference to FIGS. 7 and 8, a mobile communication system according to Modification 1 of the present invention will be described, focusing on differences from the mobile communication system according to the first embodiment described above.

As shown in FIG. 7(a), in the mobile communication system according to Modification 1, a C-RNTI #X and a C-RNTI #Y are set for the mobile station UE#A, and the C-RNTI #X is active (being actually used).

Further, in the mobile communication system according to Modification 1, the C-RNTI #X and a C-RNTI #Z are set for the mobile station UE#B, and the C-RNTI #X is active (being actually used).

In the state in FIG. 7(a), the mobile station UE#A and the mobile station UE#B are away from each other, and therefore no collision between the mobile stations UE occurs even though they are using the same C-RNTI #X.

As shown in FIG. 7(b), the mobile station UE#A and the mobile station UE#B are configured such that, when the distance between them is decreased thereafter, at least one of the mobile station UE#A and the mobile station UE#B determines that there is a mobile station UE (e.g., the mobile station UE#B) set to have the same C-RNTI #X as the C-RNTI #X set for itself, and gives the predetermined report described above.

As shown in FIG. 7(c), the radio base station PhNB#1 is configured to change the C-RNTIs set for the mobile station UE#A and the mobile station UE#B, in response to this predetermined report.

In the example in FIG. 7(c), the radio base station PhNB#1 commands the mobile station UE#A to actually use the C-RNTI #Y out of the C-RNTIs #X/#Y set therefor and commands the mobile station UE#B to actually use the C-RNTI #Z out of the C-RNTIs #X/#Z set therefor.

With reference to FIG. 8, operation of the mobile communication system according to Modification 1 will be described below.

In Step S2001, the radio base station PhNB#1 notifies the mobile station UE#A of a list of C-RNTIs targeted for the predetermined report.

Upon detection in Step S2002 that there is a C-RNTI colliding with the C-RNTI #X set for the mobile station UE#A in C-RNTIs acquired from the other mobile stations UE, the mobile station UE#A gives the radio base station PhNB#1 the predetermined report in Step S2003.

In Step S2004, to avoid the collision described above, the radio base station PhNB#1 commands the mobile station UE#A to actually use the C-RNTI #Y out of the C-RNTIs #X/#Y set for the mobile station UE#A.

The above-described features of the embodiment may also be expressed as follows.

A first feature of the embodiment is summarized as a mobile station UE#A including: a reception unit 11 configured to acquire C-RNTIs (cell-specific identifiers) set for other mobile stations UE not via a radio base station PhNB#1; and a transmission unit 13 configured to give the radio base station PhNB#1 a predetermined report when the mobile stations UE include a mobile station UE (for example, mobile station UE#B) set to have the same C-RNTI#X as a C-RNTI#X set for itself.

According to such configuration, by the predetermined report, the radio base station PhNB#1 can know that the mobile stations UE to which the same C-RNTI is assigned have gotten close to each other. Thus, collision between the mobile stations UE to which the same C-RNTI is assigned can be avoided without complicated implementation of the radio base station PhNB.

In the first feature of the embodiment, the transmission unit 13 may be configured to give the predetermined report when there is a mobile station UE (for example, mobile station UE#B) having a reception level equal to or larger than a predetermined threshold among the other mobile stations UE set to have the same C-RNTI#X as the C-RNTI#X set for itself.

According to such configuration, information not affecting collision between the mobile stations UE to which the same C-RNTI is assigned is not transmitted. Thus, overheads for the predetermined report described above can be reduced.

In the first feature of the embodiment, the transmission unit 13 may be configured to give the predetermined report targeted only at a C-RNTI designated by the radio base station PhNB#1.

According to such configuration, overheads for the predetermined report described above can be reduced.

In the first feature of the embodiment, the transmission unit 13 may be configured to transmit the number of settable C-RNTIs to the radio base station PhNB#1.

According to such configuration, the radio base station PhNB#1 can flexibly change the number of C-RNTIs to set for each mobile station UE, according to the situation.

In the first feature of the embodiment, the transmission unit 13 may be configured to activate a connection re-establishment procedure when it is detected that the set C-RNTI is different between the mobile station UE#A and the radio base station PhNB#1.

According to such configuration, an abnormal situation is avoided, where data transmission and reception cannot be performed because the set C-RNTI is different between the mobile station UE#A and the radio base station PhNB#1.

A second feature of the embodiment is summarized as a radio base station PhNB#1 configured to manage a cell #1 (phantom cell) formed by connecting multiple small cells, the radio base station PhNB#1 including: a reception unit 21 configured to acquire a predetermined report from a mobile station UE#A in the cell #1, the predetermined report indicating that there is another mobile station UE (for example, mobile station UE#B) set to have the same C-RNTI#X as a C-RNTI#X set for the mobile station UE#A; and a transmission unit 23 configured to notify the mobile station UE#B of one of multiple C-RNTI#X/#Y set for the mobile station UE#A, in response to the predetermined report.

According to such configuration, when multiple C-RNTIs can be set for each mobile station UE, collision between the mobile stations UE to which the same C-RNTI is assigned can be avoided more flexibly.

In the second feature of the embodiment, when it is detected that the set C-RNTI is different between the mobile station UE#A and the radio base station PhNB#1, the transmission unit 23 commands the mobile station UE#A to release and reset the C-RNTI#X/#Y set for the mobile station UE#A.

According to such configuration, an abnormal situation is avoided, where data transmission and reception cannot be performed because the set C-RNTI is different between the mobile station UE#A and the radio base station PhNB#1.

It should be noted that the foregoing operations of the mobile station UE#A/UE#B and the radio base station PhNB#1 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE#A/UE#B and the radio base station PhNB#1. Otherwise, the storage medium and the processor may be provided as discrete components inside the mobile station UE#A/UE#B and the radio base station PhNB#1.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-256263 (filed on Nov. 22, 2012) is incorporated by reference in the present specification.

INDUSTRIAL APPLICABILITY

As described above, the present invention can provide a mobile station and a radio base station by which, even when the same C-RNTI is assigned to multiple mobile stations in a phantom cell, collision of the mobile stations to which the same C-RNTI is assigned can be avoided with simple implementation.

EXPLANATION OF THE REFERENCE NUMERALS

UE#A, UE#B mobile station
PhNB#1 radio base station
11, 21 reception unit
12 determination unit
13, 23 transmission unit
22 setting unit

The invention claimed is:

1. A mobile station comprising:
    a receiver configured to acquire one or more cell-specific identifiers, having been set for one or more other mobile stations, through communication with the one or more other mobile stations without going through a radio base station; and
    a transmitter configured to send the radio base station a predetermined report when the one or more other mobile stations include a mobile station set to have the same cell-specific identifier as a cell-specific identifier having been set for the mobile station.

2. The mobile station according to claim 1, wherein
    the transmitter is configured to send the predetermined report when there is a mobile station having a reception level equal to or larger than a predetermined threshold among the one or more other mobile stations set to have the same cell-specific identifier as the cell-specific identifier having been set for the mobile station.

3. The mobile station according to claim 1, wherein
    the transmitter is configured to send the predetermined report targeted only at a cell-specific identifier designated by the radio base station.

4. The mobile station according to claim 1, wherein
    the transmitter is configured to transmit the number of settable cell-specific identifiers to the radio base station.

5. The mobile station according to claim 1, wherein the transmitter is configured to activate a connection re-establishment procedure when it is detected that the set cell-specific identifier is different between the mobile station and the radio base station.

6. The mobile station according to claim 1, wherein the same cell-specific identifier is assigned to the present mobile station and the one or more other mobile stations at a time prior to the present mobile station and the one or more other mobile stations being within a direct communication range of each other where communication is not possible without going through the radio base station, and the transmitter sends the predetermined report after the present mobile station and the one or more other mobile stations are within the direct communication range of each other where communication is possible without going through the radio base station.

7. A radio base station configured to manage a phantom cell formed by connecting a plurality of small cells, the radio base station comprising:
 a receiver configured to acquire a predetermined report from each mobile station in the phantom cell, the predetermined report indicating that there is another mobile station set to have the same cell-specific identifier as a cell-specific identifier having been set for the each mobile station, each mobile station being configured to acquire one or more cell-specific identifiers having been set for one or more other mobile stations through communication with the one or more other mobile stations without going through the radio base station; and
 a transmitter configured to notify the each mobile station of one of a plurality of cell-specific identifiers having been set for the each mobile station, in response to the predetermined report.

8. The radio base station according to claim 7, wherein when it is detected that the set cell-specific identifier is different between the mobile station and the radio base station, the transmitter commands the mobile station to release and reset the cell-specific identifier set for the mobile station.

9. The radio base station according to claim 7, wherein the same cell-specific identifier is assigned to the respective mobile station which sent the predetermined report and the one or more other mobile stations at a time prior to the respective mobile station and the one or more other mobile stations being within a direct communication range of each other where communication is not possible without going through the radio base station, and the respective mobile station sends the predetermined report after the respective mobile station and the one or more other mobile stations are within the direct communication range of each other where communication is possible without going through the radio base station.

* * * * *